May 28, 1963     R. H. ALPER ET AL     3,091,081
PREFILLED LIQUID ROCKET ENGINE
Filed Jan. 6, 1961     2 Sheets-Sheet 2
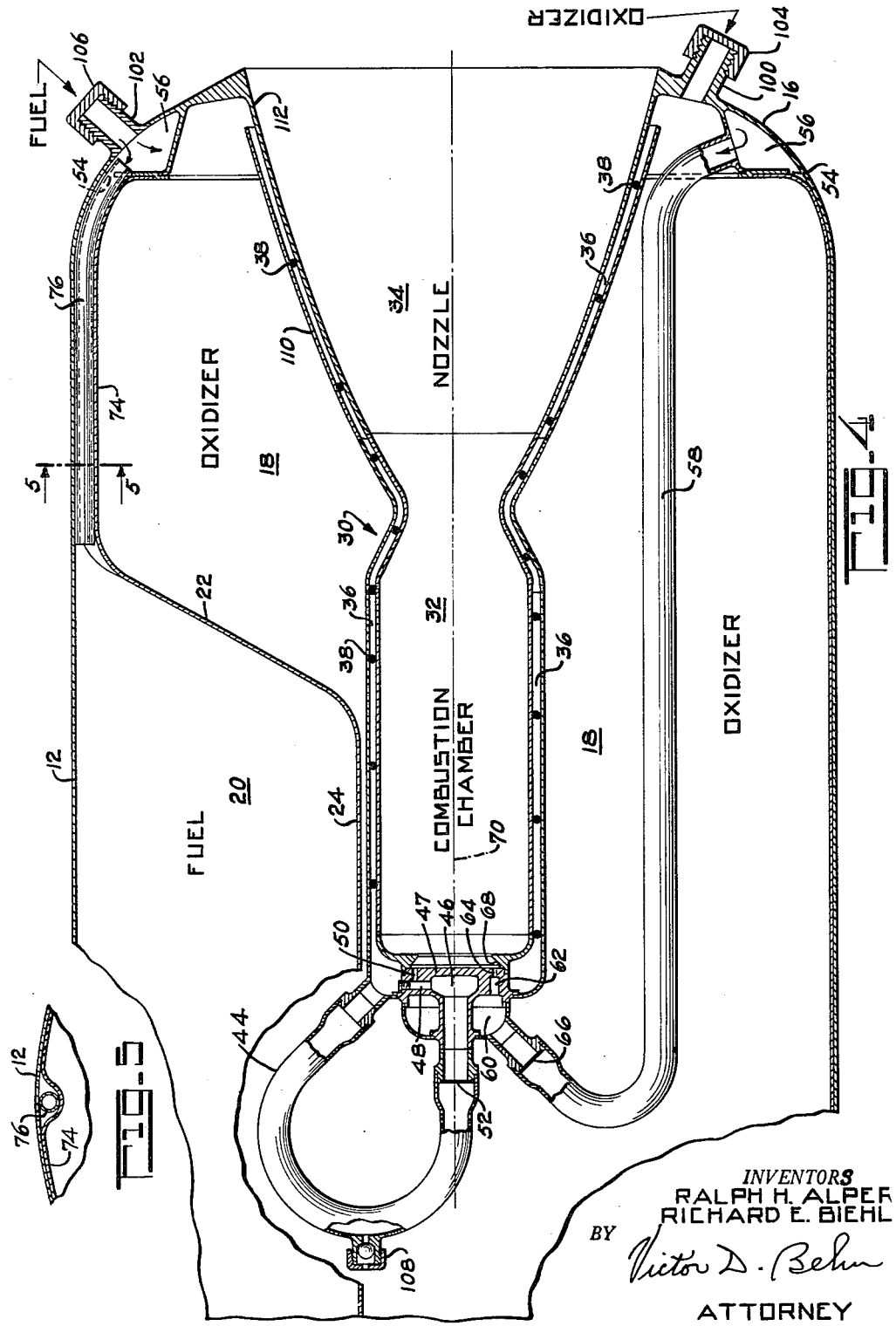
INVENTORS
RALPH H. ALPER
RICHARD E. BIEHL
BY
*Victor D. Behn*
ATTORNEY _United States Patent Office_

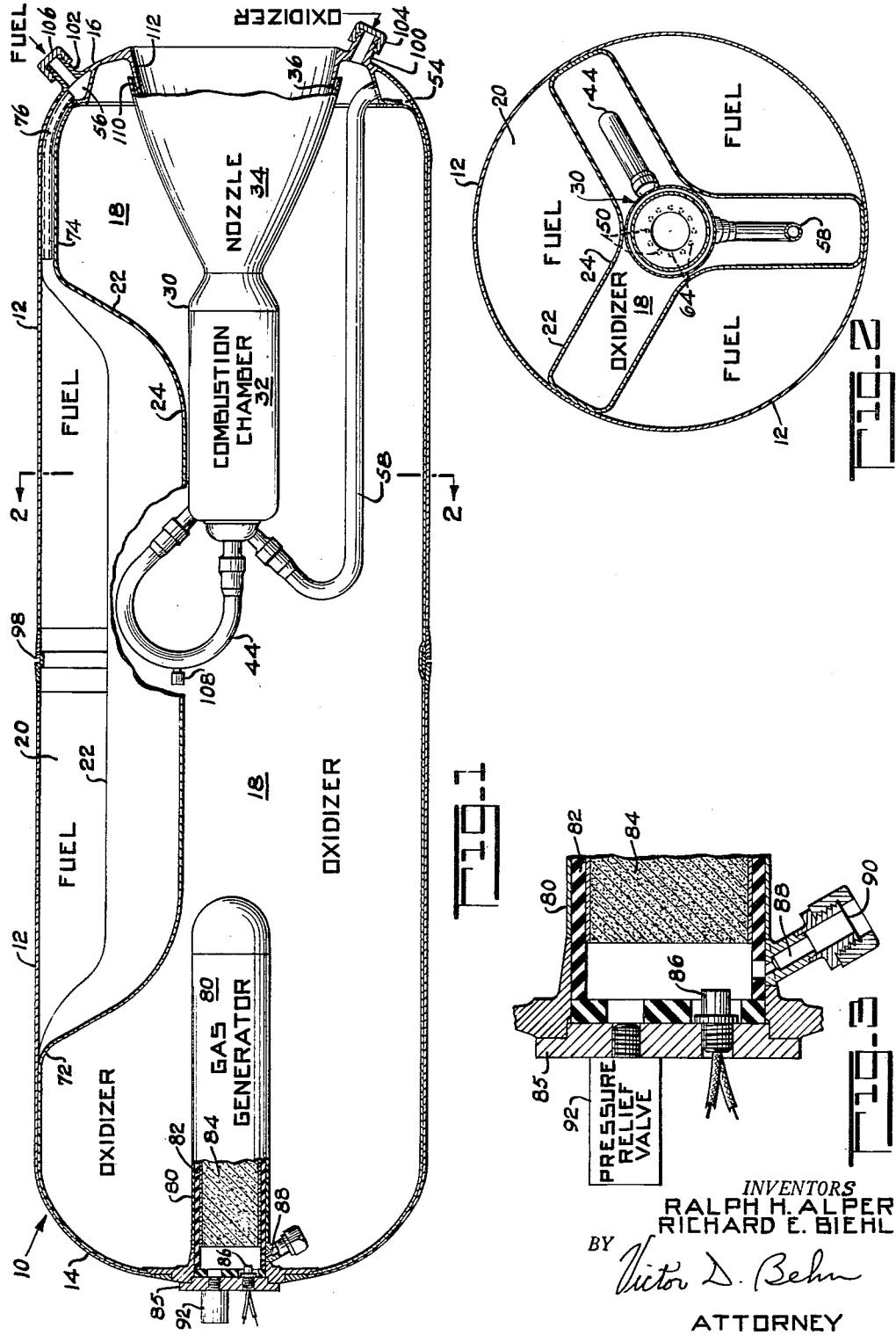

3,091,081
Patented May 28, 1963

3,091,081
PREFILLED LIQUID ROCKET ENGINE
Ralph H. Alper, Fair Lawn, N.J., and Richard E. Biehl, Pearl River, N.Y., assignors to Curtiss-Wright Corporation, a corporation of Delaware
Filed Jan. 6, 1961, Ser. No. 81,081
8 Claims. (Cl. 60—35.6)

This invention relates to rocket motors and is particularly directed to rockets employing liquid propellants.

An object of this invention comprises the provision of a novel, compact and light weight rocket motor employing a liquid propellant or propellants.

In accordance with the invention the entire rocket thrust unit, which comprises the combustion chamber and nozzle, is mounted within a vessel forming a liquid propellant reservoir for the rocket motor so that the rocket thrust unit is completely immersed in the liquid propellant stored in said vessel. During operation, the liquid propellant in the vessel is pressurized to force it into the rocket combustion chamber. Because the rocket thrust unit is immersed in the pressurized liquid propellant, the pressure differential across its walls during rocket operation is minimized. This makes possible a lightweight wall construction for the rocket thrust unit. Furthermore, immersion of the entire rocket thrust unit in the liquid propellant makes efficient use of all the space occupied by the rocket motor and thereby results in a very compact rocket motor and, in addition, facilitates use of said liquid propellant for cooling the walls of the thrust unit.

Liquid fuel rocket motors generally use two liquid propellants, namely, the fuel and oxidizer. A further object of the invention resides in the provision of a novel arrangement of a by-propellant rocket motor.

In accordance with the invention, the two liquid propellants are stored in a vessel divided into two compartments by a flexible wall with the rocket thrust unit being mounted within the vessel so as to be immersed within one of said liquid propellants. Gas under pressure is applied directly to one of the liquid propellants to force it into the rocket combustion chamber. At the same time this gas pressure deflects said flexible wall so that the other liquid propellant is also forced into the rocket combustion.

More specifically the liquid propellant storage vessel has a generally cylindrical configuration and its internal flexible wall has a generally tubular configuration extending from one end wall of the vessel to the other so as to divide the vessel into an outer compartment for one liquid propellant and an inner compartment for the other liquid propellant. The flexible wall is provided with folds running longitudinally therealong to permit said wall to be expanded against the outer wall of said vessel. The rocket thrust unit is mounted within the inner liquid propellant compartment with the nozzle of said thrust unit having its discharge end opening through an end wall of said vessel.

A still further object of the invention resides in a novel arrangement wherein a liquid propellant, in which a rocket thrust unit is immersed, is circulated through the hollow walls of said unit for cooling said walls. For this purpose the wall of the thrust unit has a hollow construction to form a passage having its upstream end communicating with said liquid propellant adjacent to the discharge end of the nozzle for flow of said liquid propellant therethrough to the rocket combustion chamber.

Other objects of the invention will become apparent upon reading the annexed detailed description in connection with the drawing in which:

FIG. 1 is an axial sectional view through a rocket motor embodying the invention;

FIG. 2 is a sectional view taken along line 2—2 of FIG. 1;

FIGS. 3 and 4 are enlarged views of portions of FIG. 1; and

FIG. 5 is a fragmentary section taken along line 5—5 of FIG. 4.

Referring to the drawing a rocket motor 10 is illustrated as comprising a preferably cylindrical vessel 12 having a generally cylindrical side wall with end walls 14 and 16. The interior of the vessel 12 is divided into two compartments 18 and 20 by a flexible wall 22, preferably of sheet metal. The flexible wall 22 has a generally tubular construction and extends from one end wall 14 to the other end wall 16 of the vessel 12 with said flexible wall ends being secured to said vessel ends. The arrangement is such that the compartment 20 is at least partially surrounded by the compartment 18 whereby the compartments 18 and 20 may be termed the inner and outer compartments respectively. The flexible tubular wall 22 has folds 24 which run longitudinally therealong and divide the outer compartment 20 into lobes. This flexible folded construction of the wall 22 permits said wall to be expanded or unfolded outwardly against the cylindrical side wall of the vessel 12. Three such folds 24 are illustrated but the invention obviously is not limited to this specific number of such folds.

A rocket thrust unit 30, comprising a combustion chamber portion 32 and a nozzle portion 34, is mounted within the vessel 12. The thrust unit 30 is supported within the inner compartment 18 so that the discharge end of its nozzle 34 is disposed at and opens through the end wall 16 of the vessel 12. The wall of the thrust unit 30 is hollow to form a passage 36 therethrough. The passage 36 preferably is in the form of a spiral which starts adjacent the discharge end of the nozzle 34 and spirals around the nozzle 34 and combustion chamber 32 to the head end of the combustion chamber. A spiral partition 38 is shown in the hollow wall passage 36 (FIG. 4) to give said passage its spiral configuration.

At its end adjacent to the end wall 16 the spiral passage 36 opens into the inner compartment 18. At the burner end of the combustion chamber 34 a supply conduit 44 connects the adjacent end of the hollow wall passage 36 to a central chamber 46 of a multi-orifice nozzle 47. The nozzle 47 has a plurality of circumferentially-spaced passages 48 which extend radially outwardly from the chamber 46 and each passage 48 terminates in a restricted orifice 50 directed in an axial direction into the combustion chamber 32. A burst diaphragm 52 is disposed across the supply conduit 44.

The liquid propellant outer compartment 20 communicates through opening 54 with an annulus 56 also disposed at the end wall 16 of the vessel 12. A supply conduit 58 connects the annulus 56 with an annular chamber 60 disposed co-axially adjacent to the central chamber 46 in the multi-orifice nozzle 47. The nozzle 47 has a plurality of circumferentially spaced passages 62 which extend from the annular chamber 60 and each passage 62 terminates in a restricted orifice 64 directed in an axial direction into the combustion chamber 32. A burst diaphragm 66 is disposed across the supply conduit 58.

The restricted orifices 50 and 64 are spaced along a circle co-axial with the combustion chamber 32 with the orifices 50 preferably alternating with the orifices 64. The rocket burner structure also includes a conical deflector plate 68 which is co-axially disposed immediately adjacent to the ring of orifices 50 and 64. Said orifices 50 and 64 direct streams or jets of their respective liquid propellants against the conical surface of the deflector plate 68 which is disposed so as to deflect propellant streams discharging through said orifices inwardly toward the combustion chamber axis 70 where said streams mix and ignite.

The end portions 72 and 74 of the tubular flexible wall 22 flare out substantially to the cylindrical side wall of the vessel 12. In order to insure communication between the outer compartment 20 and the annulus 56 a plurality of rigid tubes 76 are disposed across the end portion 74 of the flexible wall 22 as best seen in FIGS. 4 and 5.

The end 14 of the vessel 12 has an opening through which a tubular shell 80 of a gas generator 82 extends into the inner compartment 18, said shell having a closed inner end and being open at its other end for insertion of a gas generator cartridge containing a suitable solid charge 84 which upon ignition generates a gas. After the solid charge 84 has been inserted in the shell 80, the open end of the shell 80 is closed by a cover plate 85. An igniter for the charge 84 is shown at 86. The wall of the gas generator shell 80 has an opening 88 with a burst diaphragm 90 extending thereacross as best seen in FIG. 3. The gas generator is also provided with a suitable pressure relief valve 92. The valve 92 is a safety provision and also provides means for maintaining the pressures within the vessel 12 below desired limits.

As illustrated, the vessel 12 comprises two halves welded together at 98 to facilitate fabrication and assembly of the rocket motor with its flexible wall 22 and thrust unit 30 and gas generator shell 80. These components are assembled as illustrated and welded together, the final step being the welding together at 98 of the two halves of the vessel 12. After these components have been assembled and the welded junction 98 completed, the rocket motor is ready for filling its compartments 18 and 20 with liquid propellants.

The compartments 18 and 20 of the vessel 12 are filled to the extent desired through supply fittings 100 and 102 respectively preferably with the vessel 12 in a vertical position with the fittings 100 and 102 at the upper end of the vessel. The liquid propellant oxidizer preferably is placed within the inner compartment 18 and the liquid propellant fuel is placed within the outer compartment 20 as illustrated. After the compartments 18 and 20 have been filled to the desired extent with their liquid propellants the supply fittings 100 and 102 are closed by caps 104 and 106 to seal the liquid propellant within each compartment. The burst diaphragms 52 and 66 are effective at this time to prevent flow of the liquid propellants into the rocket combustion chamber.

A bleed valve 108 is provided to permit vapor or other gas to escape out from the supply line 44 so that said line can be completely filled with the liquid propellant oxidizer. For this purpose, after the compartments 18 and 20 have been filled to the desired extent and sealed as described, the rocket preferably is placed for at least a short period in a vertical position with the rocket nozzle 34 directed downwardly. When the rocket is in this latter position the liquid propellant oxidizer will completely fill the supply passages 36 and 44, any gas therein escaping through the bleed valve 108 into the compartment 18 where it rises to the surface of the liquid propellant sealed therein. The supply line 58 for the liquid propellant fuel should fill without difficulty as the outer compartment 20 is being filled.

As a final step in assembly of the rocket motor 10, the solid charge 84 is inserted within the gas generator shell 80 and the cover 85 is secured in a position over the open end of the shell 80. As a safety precaution assembly of the solid charge 84 within the shell 80 may, if desired, be delayed until the rocket motor 10 is ready to be fired. Thus the motor 10 can be stored with the charge 84 placed within the shell 80 of the vessel 12 so as to be fully ready for immediate use or it can be stored so as to be ready for use except for addition of the charge 84.

The rocket motor 10 is intended to be installed in a suitable vehicle, such as an aircraft or missile such that when fired the rocket provides the vehicle with thrust which, for example, may be used for propulsion.

The rocket motor 10 is operated by energizing the igniter 86 to ignite the charge 84. The resulting gas pressure causes the burst diaphragm 90 to burst thereby pressurizing the inner compartment 18. The liquid propellant (oxidizer) sealed within this compartment transmits this gas pressure force through the hollow wall passage 36 and supply line 44 to the burst diaphragm 52 to cause this latter diaphragm to burst whereupon the oxidizer is discharged into the combustion chamber through restricted orifices 50. At the same time the gas pressure force is transmitted by the oxidizer against the flexible wall 22 to unfold this wall toward the cylindrical outer wall of the vessel 12. The liquid fuel sealed within the outer compartment 20 thereby transmits the pressure force through the supply conduit 58 and against the burst diaphragm 66 to cause this diaphragm to burst whereupon unfolding of the flexible wall 22 forces fuel from the outer compartment 20 through the annulus 56, supply line 58 and restricted orifices 68 into the combustion chamber. The force required to unfold the wall 22 is small and therefore the liquid propellants in the two compartments are automatically pressurized to substantially the same extent.

The flow of the liquid propellant oxidizer through the passage 36 produces a pressure drop in this passage and therefore the pressure of the liquid propellant oxidizer in the inner compartment 18 is effective to hold the bleed valve 108 in its closed position, as illustrated in FIG. 4, against the lower pressure in the passage 44. When the level of the oxidizer drops below the bleed valve 108 the gas pressure generated by the charge 84 keeps the valve 108 closed thereby preventing this gas from entering the supply passage 44. As is apparent the valve 108 is a check valve which closes when a higher pressure outside the conduit 44 in the liquid propellant compartment 18 tends to cause a fluid flow therethrough in the conduit 44 directly from said compartment 18.

As the liquid propellant fuel flows out of the lobed outer compartment 20 the flexible wall 22 unfolds toward the outer wall of the vessel 12. The relatively rigid tubes 74 prevent the possibility of this unfolding of the flexible wall 22 from blocking flow of fuel from the compartment 20 to the fuel annulus 56.

The fuel and oxidizer preferably are hypergolic in that they ignite spontaneously on contact with each other within the rocket combustion chamber 32. Such hypergolic liquid propellants for rockets are well known. The gases resulting from combustion of the two liquid propellants expand and discharge through the nozzle 34 to provide thrust toward the left as viewed in FIGS. 1 and 4.

The burner structure of the combustion chamber 32 essentially consists of the annular conical member 64 together with the multi-orifice nozzle structure 47. This is a very simple and effective burner construction. Thus, the wall structure separating the nozzle chambers 46 and 60 and the nozzle passages 62, 64 and 48, 50 has a one piece construction and therefore no welded joints are necessary between the chambers and passages of the burner structure for the different liquid propellants.

The flexible wall 22 may be of a thin stainless steel sheet material. For example, a flexible stainless steel wall 22 having a thickness less than 0.015 inch was used in a particular design. The flexible wall 22 is in the form of a bag welded at its ends to the ends of the vessel 12 so that the oxidizer is completely enclosed by the wall 22 and does not contact the outer walls of the vessel 12. Of the two liquid propellants, only the fuel liquid propellant in the outer compartment 20 contacts the outer wall of the vessel 12 and therefore this outer wall need not be of a stainless steel and instead can be a suitable high strength steel.

As described, the thrust unit 30 is immersed in the liquid propellant oxidizer within the inner compartment 18 which, along with the liquid propellant fuel, is pressurized during rocket operation. Because of this and because the wall of the thrust unit is hollow to form the passage 36 for the liquid propellant oxidizer, the pressure differential across the outer portion or shell 110 of said hollow wall is quite small, this small pressure differential resulting from the pressure drop produced by the flow of said propellant through the passage 36. Hence, said outer shell 110 can have a very lightweight construction. At this point it should be noted that only the inner wall portion 112 of the hollow wall of the thrust unit 30 is secured to the end wall 16 of the vessel 12 for supporting said unit therein, the portion of the outer wall 110 adjacent said end wall 16 being free to expand and contract relative to the hotter inner wall. If desired one or more expansion joints (not shown) may be provided in the outer wall 110 to permit further expansion and contraction relative to the inner wall portion 112.

In lieu of the gas generator 82 a different source of gas pressure may be used for pumping the two liquid propellants into the rocket combustion chamber 32. For example, a container of gas under pressure may be connected to the inner liquid propellant compartment 18 for furnishing this pressure.

With this rocket assembly 10 described, both the thrust unit 30 and the gas generator are mounted entirely within the cylindrical vessel 12, the thrust unit being supported by and having its nozzle end opening through the end wall 16 of said vessel and the gas generator having its shell 80 supported by and opening through the end wall 14 of said vessel with the open end of said shell being closed by a cover plate 85. Also the gas generator and rocket thrust unit are each immersed in one of the liquid propellants. It is apparent, therefore, that the outer dimensions of the rocket assembly 10 are essentially that of a right-circular cylinder. This makes for easy and compact storage of such rocket assemblies 10. Also, since the gas generator and rocket thrust unit are each entirely immersed within one of the liquid propellants and all otherwise empty space within the vessel 12 is filled with one or the other of the two liquid propellants, there is no waste or unused space within the rocket assembly 10 thereby minimizing the size and weight of said rocket assembly 10. Furthermore, as already noted, immersion of the entire rocket thrust unit within a liquid propellant makes possible a light weight construction of the outer portion 110 of the hollow wall of said unit thereby further reducing the weight of said rocket assembly 10.

While we have described our invention in detail in its present preferred embodiment, it will be obvious to those skilled in the art, after understanding our invention, that various changes and modifications may be made therein without departing from the spirit or scope thereof. We aim in the appended claims to cover all such modifications.

We claim as our invention:

1. A rocket assembly comprising a vessel for storage of liquid propellant, said vessel having an outer wall including opposed end wall portions and a cylindrical side wall portion interconnecting said end wall portions to provide said vessel with an outer shape which is substantially that of a right circular cylinder; a liquid propellant sealed within said vessel; a thrust unit, comprising a combustion chamber and a nozzle, supported within said vessel with the nozzle having its discharge end disposed at and opening through one end wall portion of the cylindrical vessel such that both said chamber and nozzle are immersed in liquid propellant; passage means within the vessel for supplying its liquid propellant into said combustion chamber for combustion therein; and means for pressurizing liquid propellant within said vessel for causing said propellant to flow through said passage means into said combustion chamber, said pressurizing means including a casing disposed within said cylindrical vessel and secured to the other end wall portion of said vessel over an opening in said other end wall so as to close said opening against the escape of liquid propellant therethrough, said casing having means arranged to open to admit a gas under pressure from within said casing into said vessel to pressurize said liquid propellant; substantially the entire cylindrical vessel being filled with liquid propellant except for the space occupied by said casing and thrust unit.

2. A rocket assembly as claimed in claim 1 and in which the wall structure of said thrust unit is hollow and constitutes at least a portion of said passage means, one end of said hollow wall structure being at the discharge end of said nozzle and having communication with the interior of the vessel for flow of the liquid propellant therethrough to said combustion chamber.

3. A rocket assembly comprising a vessel for storage of two liquid propellants and having an outer wall including opposed end wall portions and a cylindrical side wall portion interconnecting said end wall portions to provide said vessel with an outer shape which is substantially that of a right circular cylinder; a flexible wall within said vessel dividing the interior of the vessel into first and second compartments; first and second propellants sealed within said first and second compartments respectively; a thrust unit, comprising a combustion chamber and a nozzle, supported within said cylindrical vessel such that both said chamber and nozzle are immersed in the liquid propellant in one of said compartments with the nozzle portion of said unit opening through one end wall portion of said cylindrical vessel; first and second passage means for supplying said first and second propellants to said combustion chamber; means for supplying a gas under pressure into one of said compartments to force its liquid propellant through its associated passage and into the combustion chamber and for moving said flexible wall toward the vessel outer wall to force the liquid propellant from the other compartment through its associated passage and into the combustion chamber, said gas supplying means including a casing having a closed inner end extending into said vessel and being secured to the other end wall portion of said vessel over an opening in said other end wall so that said casing closes said opening against the escape of liquid propellant therethrough, said casing having means arranged to open to admit a gas under pressure from within said casing into said vessel to pressurize said liquid propellants, said first and second compartments occupying substantially all the space within said cylindrical vessel exceut for that occupied by said casing and thrust unit.

4. A rocket assembly as claimed in claim 3 and in which the combustion chamber and nozzle of said thrust unit has a hollow wall which forms at least a portion of said passage means.

5. A rocket assembly comprising a vessel for storage of two liquid propellants, said vessel having a relatively rigid outer wall including opposed end wall portions and a cylindrical side wall portion interconnecting said end wall portions to provide said vessel with an outer shape which is substantially that of a right circular cylinder, said vessel also having a relatively flexible inner wall of generally tubular configuration and extending from one end wall portion to the other of said vessel to divide the interior of said vessel into an inner first compartment and an outer second compartment, said flexible inner wall having folds running longitudinally thereof to permit said wall to be expanded toward the outer wall of the vessel; first and second liquid propellants sealed within said inner first and said outer second compartments respectively; a thrust unit, comprising a combustion chamber and nozzle, supported within the inner first compartment of said cylindrical vessel such that both said chamber and nozzle are immersed in the liquid propellant of said inner first compartment, the nozzle portion of said thrust unit having its discharge end disposed at and opening through one end of said cylindrical vessel, said thrust unit having a hollow wall structure to form a first passage for supplying said first propellant therethrough to said combustion chamber, the upstream end of said first passage being disposed adjacent to the downstream end of said nozzle; means providing a second passage for supplying said second propellant therethrough to said combustion chamber; and means for supplying a gas under pressure to said inner first compartment to force said first propellant therefrom through said first passage to said combustion chamber and to expand said flexible inner wall toward the cylindrical outer side wall of the vessel to force said second propellant from said outer second compartment through said second passage to said combustion chamber, said gas pressure supplying means including a tubular casing having a closed inner end extending into said vessel and having its other end secured to the end wall portion of the cylindrical vessel remote from the thrust unit, said other end of the casing being disposed over an opening in said last-mentioned end wall portion of the cylindrical vessel so that said opening is closed by the casing against the escape of liquid propellant therethrough, said casing including a diaphragm arranged to burst to admit a gas under pressure from within said casing into the inner first compartment of the vessel to pressurize the liquid propellant therein, said first and second compartments occupying substantially all the space within the cylindrical vessel other than that occupied by said casing and thrust unit.

6. A rocket assembly as claimed in claim 5 and in which the inner portion of the hollow wall of the thrust unit is connected to the adjacent end wall of the vessel for supporting the thrust unit within said vessel while the adjacent end of the outer portion of said hollow wall is free to expand and contract relative to said inner portion.

7. A rocket assembly as claimed in claim 6 and in which said first propellant within which said thrust unit is immersed is a liquid oxidizer and said second propellant is a liquid fuel.

8. A rocket assembly as claimed in claim 5 and including a gas generating solid charge within said tubular casing.

References Cited in the file of this patent
UNITED STATES PATENTS

| | | |
|---|---|---|
| 2,671,312 | Roy | Mar. 9, 1954 |
| 2,711,630 | Lehman | June 28, 1955 |
| 2,744,380 | McMillan et al. | May 8, 1956 |
| 2,789,505 | Cumming et al. | Apr. 23, 1957 |
| 2,939,281 | Conyers | June 7, 1960 |
| 2,943,673 | Hickman | July 5, 1960 |
| 2,955,649 | Hoffman et al. | Oct. 11, 1960 |
| 2,958,183 | Singelmann | Nov. 1, 1960 |
| 2,974,626 | Zwicky | Mar. 14, 1961 |